Sept. 10, 1963  E. B. CONNELLY  3,103,140
COMBINATION TOOL HEAD FOR FINISHING PIPE ENDS
Filed March 10, 1961  3 Sheets-Sheet 1
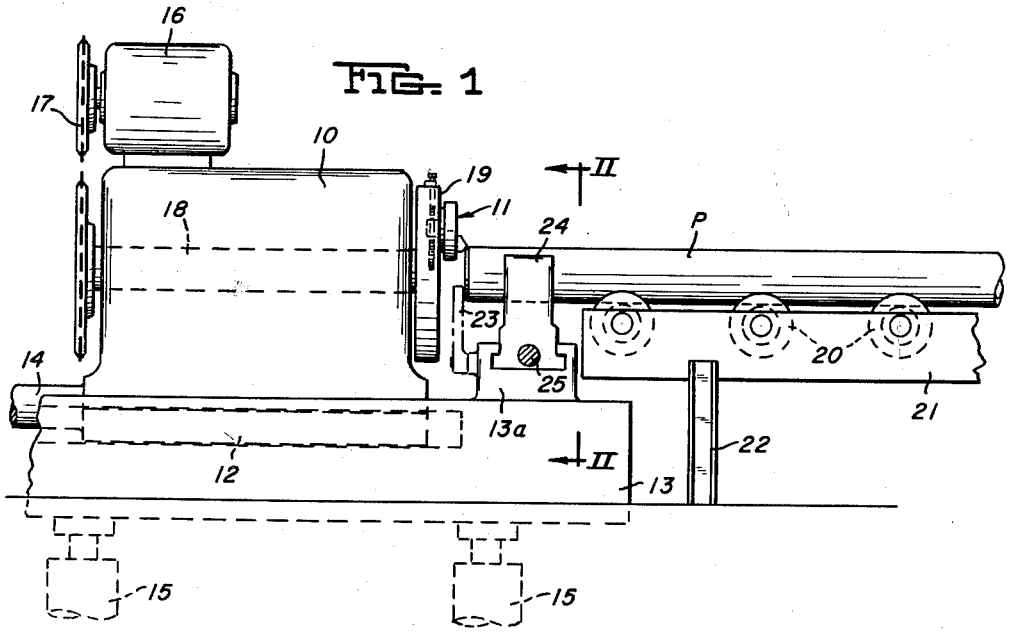
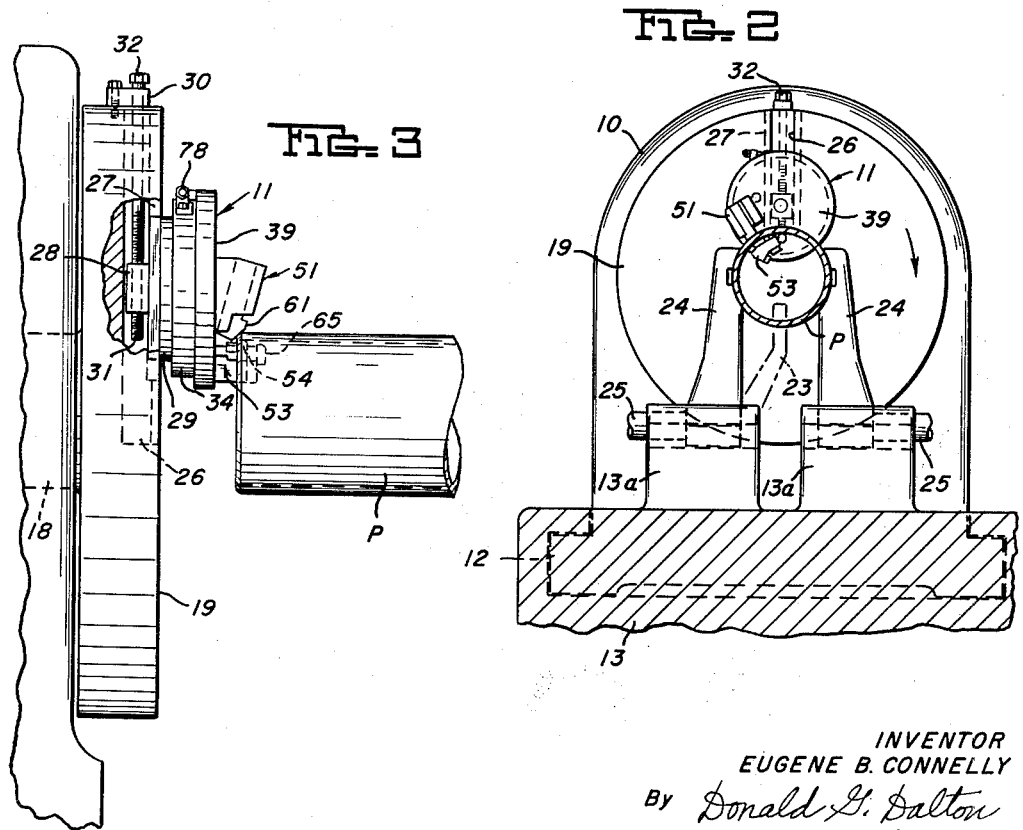
INVENTOR
EUGENE B. CONNELLY
By Donald G. Dalton
Attorney

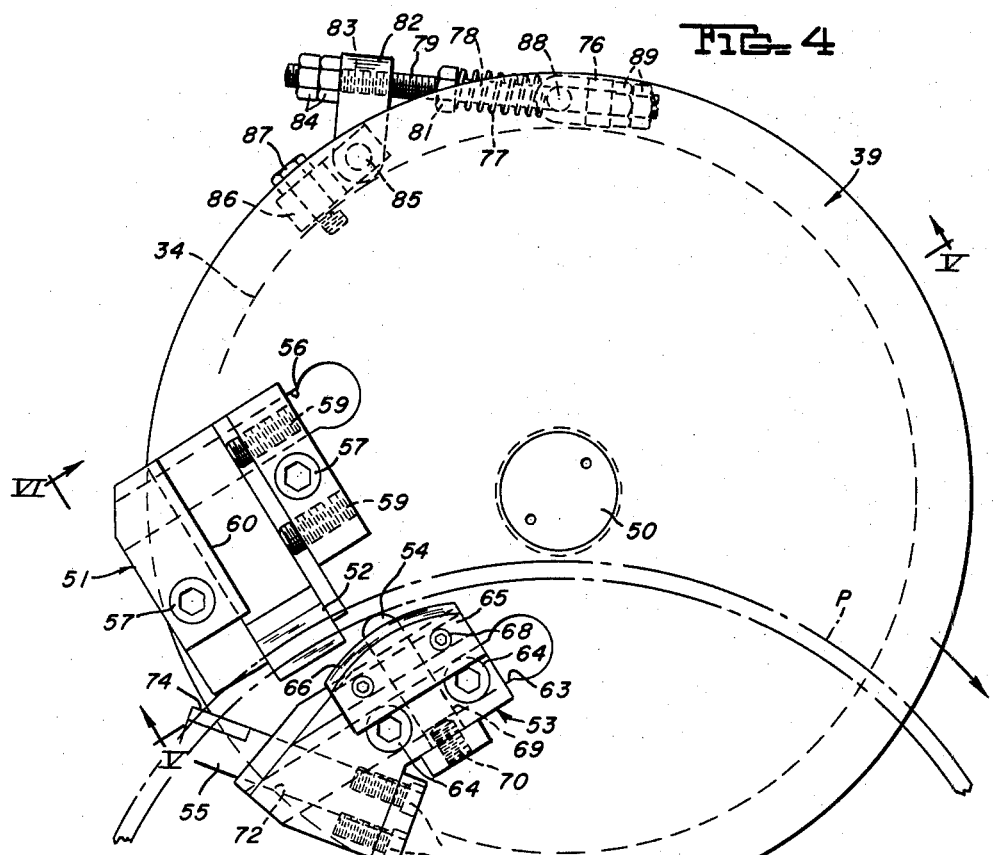
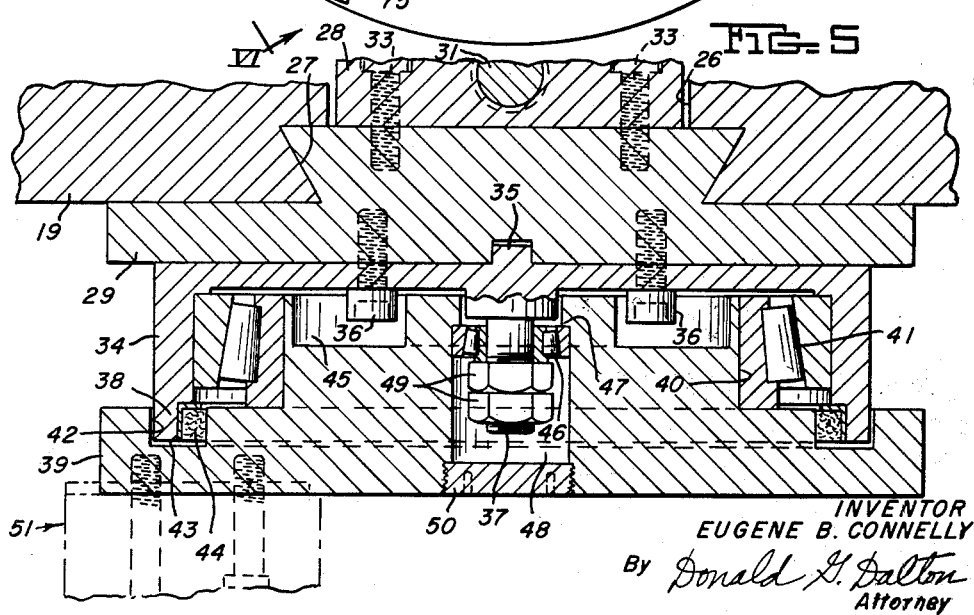

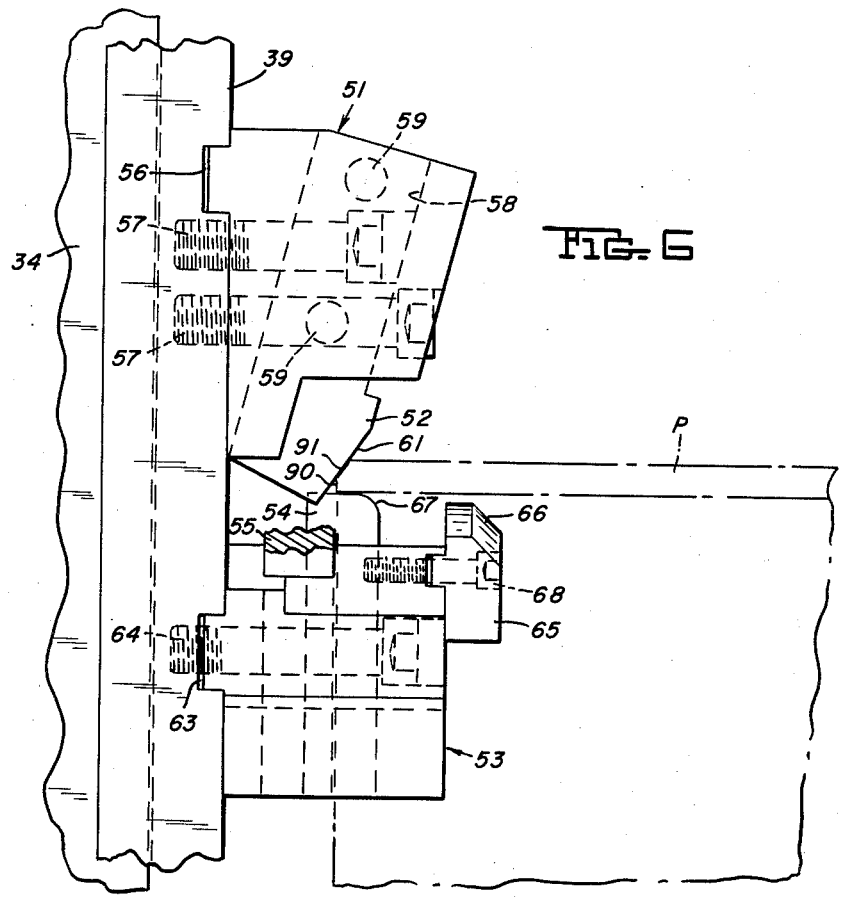
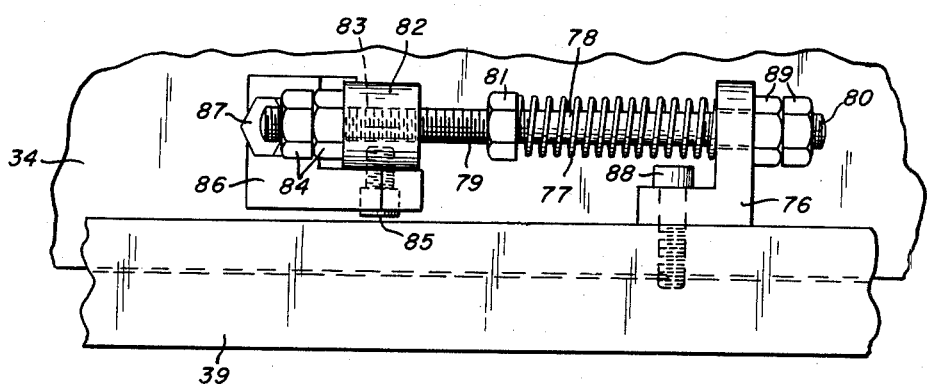

United States Patent Office 3,103,140
Patented Sept. 10, 1963

3,103,140
COMBINATION TOOL HEAD FOR FINISHING PIPE ENDS
Eugene B. Connelly, Pittsburgh, Pa., assignor to United States Steel Corporation, a corporation of New Jersey
Filed Mar. 10, 1961, Ser. No. 94,804
6 Claims. (Cl. 82—2)

This invention relates to an improved tool assembly for facing and beveling pipe ends.

Facing and beveling the ends of line pipe have always been important operations, since adjacent faced ends of successive lengths must be uniform for good welding practice. Since field practice requires the use of inside, expanding pipe clamps it becomes essential that adjacent pipe ends have uniform faces, which requires end facing accurately relative to the inside circumferential surface. Variations in pipe-wall thickness accordingly result in wider or narrower beveled surfaces that are also true to the side circumferential surface.

An object of the present invention is to provide a tool assembly for facing and beveling pipe ends true to the inside circumferential surface thereof.

A further object is to provide a tool head having bearing-supported float or oscillation means for facing and beveling pipe ends under heavy feed loads, yet permitting compensation for out-of-roundness and wall variations in the pipe.

A more specific object is to provide a tool assembly rotatable concentrically with a pipe axis, adjustable for a range of pipe diameters and wall variations, which includes a bearing base slidably adjustable transversely to a pipe axis, a controllably oscillatable tool plate mounted thereon by roller bearings, and tooling including a guide block, an internal rider block and opposed external bevel tool and a follower facing tool.

In accomplishing these and other objects of the invention, I have provided improved details of structure, a preferred form of which is shown in the accompanying drawings, in which:

FIGURE 1 is a side elevational view of a pipe-facing lathe and pipe conveyor with the tool assembly attached to the lathe face plate;

FIGURE 2 is a view taken on the plane of line II—II of FIGURE 1, showing the pipe-clamping means and the face plate and tool plate in elevation;

FIGURE 3 is an enlarged tool-assembly view similar to FIGURE 1, with parts broken away to show the details;

FIGURE 4 is an enlarged elevation of the tool assembly as would be seen when looking to the left in FIGURE 3;

FIGURE 5 is a cross-sectional view taken on the line V—V of FIGURE 4, showing the internal structure of the tool assembly;

FIGURE 6 is a view taken on the plane of line VI—VI of FIGURE 4, showing the arrangement of the tool plate and tooling; and FIGURE 7 is a plan view of a spring-biased rod used to maintain the pre-entry position of the tool assembly and permit tool-plate oscillation.

As shown in FIGURES 1, 2 and 3, a facing machine or lathe 10 carrying tool-head assembly 11 is longitudinally reciprocable on ways 12 that are slidable on base 13 by means of piston 14. Base 13 is vertically adjustable on elevators 15. A variable-speed motor 16, through drive 17, rotates lathe shaft 18, lathe face plate 19 and tool-head assembly 11 attached thereto.

Reversible driven rolls 20 supported on table 21 on pedestals 22 advance a length of pipe P to a retractable stop 23, pivoted in one of two spaced-apart abutments 13a, attached to lathe base 13. Abutments 13a slidingly support opposed reciprocable jaws 24 that are movable transversely of the pipe axis by means of pistons 25, to clamp pipe P rigidly before stop 23 is retracted.

As shown in FIGURES 3 and 5, tool assembly 11 is slidable transversely of the axis of rotation of face plate 19 which coincides substantially with the axis of a rigidly clamped pipe P. A recess 26 in plate 19 opens outwardly to receive a threaded block 28. A dove-tailed bearing plate 29 is reciprocable in ways 27. Bracket 30 (FIGURE 3) bolted to the perimeter of plate 19 supports adjustment screw 31 which threadedly engages block 28. By rotation of its head 32, screw 31 slides assembly 11 perpendicular to said axis of rotation to adjust it for a change in pipe size. Adjustment screw 31 is rigidly held in position by a lock nut (not shown). Block 28 is bolted to plate 29 by cap screws 33. A base ring 34 is keyed to recess 35 in plate 29 and fastened thereto by cap screws 36. The ring 34 has a central bolt 37 with its threaded portion extending outwardly on the center line thereof. The ring 34 also has a stepped outward recess 38 to receive a tool-mounting or tool-holding plate 39, which is in turn inwardly recessed at 40 to receive thrust bearing 41, and inwardly recessed at 42 to receive the outward end 43 of ring 34 and grease seal 44, and at 45 to allow clearance for cap screws 36.

Ring 34 and tool plate 39 support circular, tapered-roller, thrust bearing 41 and grease seal 44 therebetween. A retainer bearing 46 is seated in outward recess 47 of bore 48 in plate 39 and journals bolt 37. Nuts 49 screwed on bolt 37 preload bearing 46 to pivotally and oscillatably retain plate 39 thereon and in turn on bearing 41 and base ring 34. The longitudinal and pivotal tool loads are carried by thrust bearing 41. A plug 50 closes the outward portion of bore 48 and with grease seal 44 permits prepacking of bearings 41 and 46, to thereby exclude foreign materials from the mating moving surfaces. Bearing plate 29 may be recessed to mount bearings 41 and 46 and to journal a tool-holding plate 39 flatwise thereon for rotation relative thereto.

As shown in FIGURES 4 and 6, the outer face of tool plate 39 carries an outwardly projecting tool holder 51 mounting tool 52 for beveling the outer circumference of pipe P. Another outwardly projecting holder 53 is also mounted on plate 39 for an opposed, accurately spaced apart, inner circumference bearing or rider block 54 that is held securely against the inner circumference at all times, thereby assuring the cutting of a bevel with a resultant, uniformly accurate vertical edge or face on the end of pipe P. Holder 53 is offset at the end remote from rider block 54 to receive a trailing facing tool 55 to remove any burrs left by tool 52. Thus tools 52 and 55 produce a freshly cut, accurately dimensioned, vertical edge or face on the end of pipe P, that is true to the inside circumferential surface thereof. In the illustrations, the tool holders of assembly 11, mounted on face plate 19, move in a clockwise direction as viewed in FIGURE 4, concentric with the axis of said face plate's clockwise rotation.

Beveling tool holder 51 is keyed at 56 to tool plate 39 and fastened thereto with cap screws 57. Holder 51 has an outwardly-open, shouldered recess 58 for receiving beveling tool 52. Set screws 59 rigidly hold tool 52 under shoulder 60. As shown, cutting edge 61 lies in a plane substantially at an angle of 60° with respect to the axis of pipe P. This angle may vary, depending on welding requirements. Preferably, cutting edge 61 as well as the cutting, bearing and shock-receiving edges of the tools to be described hereinafter are of a hard carbide, such as tungsten carbide or silicon carbide.

Tool holder 53 is keyed at 63 to tool plate 39 and fastened thereto with cap screws 64. While tool assembly 11 is positioned to permit beveling and facing of a particular size of pipe, it must be understood that as between pipe of any particular size, diameter and wall variations occur. Individual pieces of many pipe are neither perfectly round nor of perfectly uniform wall thickness at the ends thereof. When the end of pipe P is clamped as hereinabove described and piston 14 moves lathe 10 to engage the pipe, a guide block 65, and more particularly its frusto-conical surface 66 is provided to guide, if necessary, the leading end of a pipe length until it meets the rounded surface 67 of rider block 54. As the pipe continues its slide thereover, it is caught in the bite between said rounded surface and the cutting edge 61 of beveling tool 52. Guide block 65 is fastened to tool holder 53 with cap screws 68. Rider block 54 is inserted in a bore 69 in tool holder 53, said shaped bore lying substantially at a right angle to the said axis of rotation. Screws 70 hold rider block 54 rigidly in place.

Tool holder 53 is angularly offset at the end spaced-apart from the end supporting guide block 65, the offset having a shaped bore 72 to receive facing tool 55, the cutting edge 74 thereof lying in a plane at a right angle to said axis of rotation. Screws 75 rigidly hold facing tool 55 in position. As shown in FIGURE 4, facing tool 55 trails behind or follows rider block 54 and beveling tool 52, facing that part of the pipe end untouched by the beveling tool 52 when it has completed its operation to provide a dimensionally accurate, smooth face.

Guide block 65 and more particularly its frusto-conical surface 66 preferably engage the leading end of round or out-of-round pipe and thereafter the inner circumference of that end, followed by the inner circumference engagement by rider block 54 and the outer circumference engagement and beveling by tool 52, when the pipe is caught and firmly held between these two tools. Although not preferred, the pivoting may be clockwise, should the pipe be excessively out-of-round, the end thereof striking beveling tool edge 61 and moving therealong until it is firmly held between this edge and rider block 54.

A spring-biased rod 78, mounted at its extremities respectively on ring 34 and on tool plate 39 is provided as a yielding torque means to constantly urge tool plate 39 in a direction such as to cause rider block 54 to engage pipe P interiorly. Hence, as the end and the inner circumference of pipe P engage guide block 65 and thereafter rider block 54, these tools and tool plate 39 are forced downwardly as viewed in FIGURE 6 and pivoted counterclockwise on bearings 41 and 46 as viewed in FIGURE 4. As shown in FIGURES 4 and 7, this pivoting forces bracket 76 mounted on tool plate 39 to compress spring 77 on rod 78. Spring 77 serves to hold rider block 54 tightly against the inner circumference of pipe P until the pipe end is caught and held firmly between block 54 and beveling tool 52. As rotating assembly 11 is fed further forward, sufficient pressure is built up between rider block 54, which is rounded and dull, and beveling tool 52 which is sharp, to force the beveling tool to cut the required shape on the outside circumferential edge of the pipe end. Rod 78 has threads 79 and 80 cut on the respective ends thereof, a nut 81 being threaded on and welded to the rod at the inner end of thread 79. As shown in FIGURE 4, rod 78 is retained between base ring 34 and tool plate 39 at about a twelve o'clock position on the respective peripheries, although it may be retained in other positions, for example, at a three o'clock position. An outwardly extending arm 82, having a threaded hole 83 therein to receive threaded end 79, is retained on rod 78 by threaded nuts 84 and in turn by cap screw 85 on bracket 86, the latter being retained on base ring 34 by cap screw 87. Bracket 76 retained on tool plate 39 by cap screw 88, retains spring 77 against nut 81, the initial compression of spring 77 being effected by threaded nuts 89.

Spring-biased rod 78 has two primary functions. Firstly, it serves to press rotating, advancing rider block 54 firmly against the inner circumference of the end of pipe P, despite out-of-roundness and wall variations in the pipe end, until the rider block and beveling tool firmly grip the pipe in cutting relationship, all in a controlled, oscillating relationship between the base ring 34 and tool plate 39. Secondly, this arrangement retains tool plate 39 and the tools thereon in the desired position for entering an end of pipe, substantially as shown in FIGURE 4 rather than permitting the tool plate the freedom to oscillate on bearings 41 and 46 during the period between facing operations. When making a size change, the desired, pre-entry position of the non-rotating tool assembly 11 is established by observation as it is advanced with respect to the pipe end and final adjustment is made, if required, with screw head 32. While it is preferred to employ the described means to constantly urge the rider block to engage the pipe interiorly until the rider block and beveling tool firmly grip the pipe in cutting relationship, its use is not mandatory. The pre-set opposed relationship of these tools with respect to a pipe end, will assure accurate cutting-tool operation without use of this means.

It is evident from the foregoing description that although pipe P is neither perfectly round nor of perfectly uniform wall, rider block 54 will guide beveling tool 52 to produce a pipe end having a perfectly uniform face width. All tool pressures are carried directly by pre-loaded, tapered roller bearing 41. Hence, tool pressures in no way affect the free oscillation of tool plate 39 in following the irregularities created by out-of-round and/or non-uniform pipe walls.

In operation, powered rolls 20 deliver a pipe P against a stop 23, pistons 25 close jaws 24 to clamp the pipe and stop 23 is retracted. With an appreciable size change from the former to the present pipe to be beveled and reamed, elevators 15 may raise or lower base 13 and facer or lathe 10, piston 14 thereafter advancing lathe 10 to the position shown in FIGURE 1. With respect to plate 19, adjustment screw 31 is appropriately turned by adjustment screw head 32 to raise or lower threaded block 28, plate 29 and tool assembly 11, to position the frusto-conical surface 66 of guide block 65 so that it will meet the end of pipe P. The lock nut is then tightened to rigidly position adjustment screw 31. Previous to the above described operations, appropriate compression is applied to spring 77 on rod 78 by turning nuts 89 against bracket 76. Tool plate 39 will then be free to float or oscillate with respect to base ring 34 on thrust bearings 41 and 46.

Lathe 10 may now be retracted, motor 16 started and brought up to speed thereby rotating face plate 19 about a substantially common axis of rotation comprising the centerlines of the lathe, face plate and pipe P and in turn moving tool assembly 11, as shown in FIGURE 4, clockwise in a circle having as a center said common axis of rotation. In advancing the rotating lathe 10 toward the pipe P, the surface 66 of guide block 65 meets the pipe end, said end sliding over said advancing, counterclockwise-pivoting guide block surface and thereafter over surface 67 of rider block 54 and the ultimate bearing or sliding surface thereof as shown in FIGURE 6. Since these successive surfaces increase in their radial distance from the pivot point, the counterclockwise pivoting becomes successively greater. Such pivoting of the guide block, rider block and the other tools attached to tool plate 39 takes place since tool plate 39 may rotate or oscillate relative to base ring 34 on bearings 41 and 46.

The described, increasing counterclockwise pivoting further compresses spring 77 on rod 78 by means of bracket 76. Preferably, this compression range is broad enough to assure effective spring compression during the clockwise movement of tool plate 39 around the pipe end, regardless of its out-of-roundness. Conversely, where a pipe end is not a perfect circle, tool plate 39 will oscillate or float as the rider block traverses the inside circumferential surface of an out-of-round pipe end. More importantly, compressed spring 77 makes it possible to maintain the rider block firmly pressed against said inside edge, while the lathe continues advancing, to assure the pipe end being forced into proper cutting engagement with cutting edge 61 of beveling tool 52.

As the lathe continues advancing, sufficient pressure is created between the rounded surface of the rider block and the sharp edge of the beveling tool to hold these tools in their proper opposed relationship without the help of spring 77. The respective tools burnish the inside circumferential surface to remove burrs of prior machining operations and cut the required shape or bevel on the outside circumferential surface of the pipe end. The resultant thrust on tool plate 39 is received by bearing 41, with no impairment in the required oscillation of this plate. For example, with tungsten carbide tooling, this operation has been performed satisfactorily at up to 600 surface feet per minute. When this beveling operation is substantially completed, further advance of the lathe will bring the follower facing tool 55 into cutting relationship with the vertical end face of the pipe to remove any burrs from the beveling and burnishing operations and to provide a freshly cut end face. The lathe, reciprocable pipe jaws and the pipe P may be successively retracted, another pipe positioned and the hereinabove described operation repeated automatically.

The opposed edges of the rider block and beveling tool are spaced apart accurately, both dimensionally and in angular relationship therebetween. The facing tool is similarly related to these tools. Hence, for any required conditions, the dimensions of end face 90 will always be the same, as shown in FIGURE 6, since the rider block is pressed firmly against the inner circumference of the pipe. As the pipe wall varies, the width of the bevel 91 will be longer with a thicker pipe wall and shorter with a thinner pipe wall. Should the end face exhibit a defect, the lathe may be advanced the required distance to remove defective metal from the end face and a new bevel cut made. However, the dimensions 90 of the end face remain the same and are true to the inside circumferential surface of the pipe.

As described hereinabove, the lathe face plate and the tool assembly are positioned to provide a substantially common axis of rotation comprising the centerlines of the lathe, face plate and pipe. At the pipe end being beveled and faced, the centerline of out-of-round pipe may not coincide with that of round pipe. The centerline of a round pipe end need not coincide exactly with that of the lathe and face plate, since the flexibility of the oscillating tool plate and tools will effect a uniform bevel and end face thereon, just as on out-of-round pipe.

From the foregoing description, it will be apparent that the present invention provides a tool assembly of simple, rugged construction, the components thereof cooperating to provide a uniform end face that is always true to the inside circumferential surface of a pipe end. Adjustments for different sizes of pipe are effected very simply by turning an adjustment screw. There is no need for disturbing the cutting tools, unless the dimensions of the end face require change. This usually requires adjustment of a single tool only, that is, the beveling tool in order to provide the required spaced-apart relationship with respect to the opposed rider block. This opposed relationship is made effective by providing a pre-loaded, tapered, roller bearing to absorb the thrust of the tooling, yet permit free oscillation thereof to follow the irregularities created by out-of-round pipe or non-uniform pipe walls.

While I have shown and described only a single embodiment of my invention, it is apparent that modifications may arise. Therefore, I do not wish to be limited to the disclosure set forth but only by the scope of the appended claims.

I claim:

1. Apparatus for finishing pipe ends regardless of their being out-of-round and exhibiting wall-thickness irregularities comprising a lathe face plate, a bearing plate slidable transversely thereon, a ring secured to said bearing plate, a tool-mounting plate journaled for rotation in said ring, a block mounted on and projecting from said tool-mounting plate adapted to engage interiorly a pipe end when relative movement toward each other occurs between said end and said face plate and a beveling tool on said tool-mounting plate in opposed relation to said block adapted to engage the outside edge of said pipe end after said block has engaged the interior thereof.

2. Apparatus according to claim 1 characterized by means yieldingly urging said tool-mounting plate in a direction such as to cause said block to engage interiorly a pipe end while allowing tool-mounting plate rotation in the other direction to accommodate irregularities in the pipe end.

3. Apparatus according to claim 1 characterized by a frusto-conical guide block mounted on said tool-mounting plate adapted to engage interiorly a pipe end in advance of said block.

4. Apparatus according to claim 1 characterized by a facing tool mounted on said tool-mounting plate adapted to engage the face of said pipe end at a right angle to the axis of the pipe end, after said beveling tool has engaged said outside edge.

5. Apparatus according to claim 1 characterized by a threaded rod supported on said lathe face plate adapted to engage and to slide said bearing plate transversely.

6. Apparatus according to claim 1 characterized by a pair of thrust bearings mounted concentrically on said ring adapted to journal said tool-mounting plate for rotation.

References Cited in the file of this patent

UNITED STATES PATENTS

| 2,284,642 | Denner | June 2, 1942 |
| 2,821,781 | Zeiler | Feb. 4, 1958 |

FOREIGN PATENTS

| 305,482 | Switzerland | May 2, 1955 |
| 625,218 | Germany | Feb. 6, 1936 |